US005108603A

United States Patent [19]

Schuette

[11] Patent Number: 5,108,603

[45] Date of Patent: Apr. 28, 1992

[54] SELF-CONTAINED VACUUM CLAMPED MULTI-SAMPLE MEDIA FILTRATION APPARATUS AND METHOD

[75] Inventor: Michael W. Schuette, Vienna, Va.

[73] Assignee: Life Technologies, Inc., Gaithersburg, Md.

[21] Appl. No.: 680,560

[22] Filed: Apr. 4, 1991

[51] Int. Cl.[5] .......................... B01L 3/00; G01N 1/00

[52] U.S. Cl. ............................ 210/321.72; 210/323.1

[58] Field of Search ..................... 210/322, 323.1, 340, 210/341, 343-345, 321.6, 321.64, 321.72, 321.75, 321.84, 416.1; 422/99, 101-104

[56] References Cited

U.S. PATENT DOCUMENTS

| | | |
|---|---|---|
| 3,956,125 | 5/1976 | Strutt et al. . |
| 4,090,850 | 5/1978 | Chen et al. . |
| 4,427,415 | 1/1984 | Cleveland . |
| 4,493,815 | 1/1985 | Fernwood et al. . |
| 4,704,255 | 11/1987 | Jolley . |
| 4,777,021 | 10/1988 | Wertz et al. . |
| 4,787,988 | 11/1988 | Bertoncini et al. . |
| 4,822,741 | 4/1989 | Banes . |
| 4,834,946 | 5/1989 | Levin . |
| 4,874,691 | 10/1989 | Chandler . |
| 4,895,706 | 1/1990 | Root et al. . |
| 4,927,604 | 5/1990 | Mathus et al. . |
| 4,948,564 | 8/1990 | Root et al. . |
| 4,978,507 | 12/1990 | Levin . |

*Primary Examiner*—Frank Sever

*Attorney, Agent, or Firm*—Sterne, Kessler, Goldstein & Fox

[57] ABSTRACT

An apparatus for filtering multiple biological samples using a filter membrane is disclosed. The apparatus comprises a well plate having at least one well adapted to contain the sample media. The apparatus further comprises a vacuum-clamping feature for placing the filter membrane in sealable contact with at least one well of the well plate. The apparatus further comprises a vacuum sampling feature for drawing the sample media contained in the at least one well into contact with the filter membrane. The apparatus further comprises a first vacuum chamber for providing vacuum to the vacuum sampling feature. The first vacuum chamber is an integral part of the apparatus. The apparatus further comprises a second vacuum chamber for providing vacuum to the vacuum clamping feature. The second vacuum chamber is also an integral part of the apparatus.

13 Claims, 6 Drawing Sheets

SELF-CONTAINED VACUUM CLAMPED MULTI-SAMPLE MEDIA FILTRATION APPARATUS AND METHOD

BACKGROUND OF THE INVENTION

1. Field of the Invention

This invention relates generally to an apparatus and method thereof for biochemical testing and screening. More particularly, the present invention relates to a multi-sample filtration apparatus and method thereof for biomedical testing and screening of multiple samples.

2. Related Art

Multi-sample filtration apparatus are generally used for sampling all types of media. For example, in molecular biology applications, the testing of extracts of blood, extracts of cells or purified nucleic acids from a variety of sources is a common application of the apparatus. In the area of immunology, the testing of extracts of blood, whole cells or purified materials are common applications.

Conventional apparatus typically operate by allowing a sample to come into contact with a filter membrane. Tests are then performed on the membrane, and a variety of determinations can be made regarding the sample media. Conventional filtration devices further allow for testing of multiple samples, so as to allow more than one type of media or multiple samples of identical media to be tested.

One type of multi-sample filtration apparatus, disclosed in Fernwood et al U.S. Pat. No. 4,493,815 (referred to herein as the "Fernwood Patent") employs a vacuum member to draw the media into contact with a filter membrane. The purpose of the vacuum member is to bring the media in contact with the filter membrane The Fernwood Patent also discloses a plurality of mechanical screws for "sandwiching" (clamping) the assembly together. Clamping of the assembly is necessary to prevent migration of samples on the membrane and leakage of vacuum.

Apparatus such as that disclosed by the Fernwood Patent, however, have several disadvantages. One disadvantage relates to sealing. If a good seal is not obtained, samples will migrate across the filter membrane causing serious problems when a lab technician is trying to analyze the membrane. Some samples will be destroyed, others will be placed in a condition that will not readily facilitate analysis by the technician.

Another disadvantage relates to operation of the apparatus. Conventional methods of manually creating a seal are cumbersome. Screws and clamps must be fastened and unfastened, parts must be taken apart. Use of screw and clamp is inefficient and creates a significant loss in production output.

Another disadvantage relates to the necessity for connecting the sampling vacuum to an external vacuum source. The requirement of having to connect the sampling vacuum to an external source places restrictions on the use of the apparatus. As such, a lab having multiple apparatus would have to have multiple vacuum source. Furthermore, the apparatus would not be portable in that it must be used in connection with a particular external vacuum source.

SUMMARY OF THE INVENTION

The present invention is directed to over-coming one or more of the problems set forth above. In one embodiment, the present invention is an apparatus for testing sample media using a filter membrane. The apparatus first comprises a well plate configured in a standard 96 well microtiter configuration. Each well is adapted to contain the sample media.

The apparatus further comprises a first means for vacuum-clamping the filter membrane in sealable contact with the well plate using a self-contained vacuum source as opposed to an external vacuum source. The vacuum clamping means seals each of the wells of the well plate in contact with the filter membrane.

The apparatus further comprises a second means for drawing the sample media contained in each well of the well plate into contact with the filter membrane using a self contained vacuum source as opposed to an external vacuum source.

The vacuum clamping means comprises a vacuum clamping valve mounted on a base plate. The clamping valve is adapted to turn "on" and "off" the self contained vacuum source.

The self contained vacuum source comprises a first receptacle dedicated to supplying the vacuum necessary of the vacuum clamping means. The first receptacle may be recharged when needed to an appropriate vacuum level by an external vacuum source.

The vacuum clamping valve is rotatable to a first position where the vacuum clamping valve is in an "on" position and a second position where the vacuum clamping valve is in an "off" position. When the vacuum clamping valve is in said "on" position, the first channel is in communication with the first vacuum receptacle.

The vacuum clamping means may further comprise a gasket. The gasket has first and second substantially parallel elastomeric surfaces and a plurality of wells in registration with wells of the well plate.

The base plate has formed therein a vacuum reservoir surrounded by a plurality of islands. The gasket is mounted about the islands of the base plate to form a vacuum clamping area.

The vacuum clamping feature of the present invention provides several advantages heretofore unavailable in conventional media testing apparatus. One such advantage relates to the resultant sample media on the filter membrane, In particular, the vacuum clamping feature provides a more consistent clamping force that of screws and clamps used in conventional apparatus. A consistent clamping force ensures that each of the sample media will be properly placed on the filter membrane. A second advantage relates to operation. More particularly, the vacuum clamping feature makes operation of the present invention significantly easier than conventional apparatus. Ease of operation leads to increased production output and efficiency.

Moreover, because the source of vacuum for the vacuum clamping feature and the sampling vacuum feature are self-contained, the apparatus of the present invention can easily be tested in a variety of circumstances. Conventional apparatus required a connection to an external vacuum source which may severely restrict use of the apparatus.

BRIEF DESCRIPTION OF THE DRAWINGS

The following detailed description of the present invention will be more fully understood with reference to the accompanying drawings, in which.

DETAILED DESCRIPTION OF THE PREFERRED EMBODIMENTS

In one embodiment, the present invention is an apparatus configured to sample media. One feature of the present invention is a first vacuum member adapted to bring the media in contact with a filter membrane. A second feature of the present invention is a second vacuum member adapted to provide the clamping force necessary to seal the apparatus so that the first vacuum member can properly bring the media in contact with the filter membrane. A third feature of the present invention is that the first vacuum sampling feature and the second vacuum clamping feature need not be connected to an external vacuum source. The present invention may comprise a first and second self-contained vacuum source dedicated to supplying the necessary vacuum to the first vacuum sampling feature and the second vacuum clamping feature, respectively.

As will become obvious to one skilled in the art, the vacuum clamping feature of the present invention provides several advantages heretofore unavailable in conventional media testing apparatus. One such advantage relates to the resultant sample media on the filter membrane, In particular, the vacuum clamping feature provides a more consistent clamping force than the screws and clamps used in the conventional apparatus. A consistent clamping force ensures that each of the sample media will be properly placed on the filter membrane. A second advantage relates to operation. More particularly, the vacuum clamping feature makes operation of the present invention significantly easier than conventional apparatus. Ease of operation leads to increased production output and efficiency.

As will also become obvious to one skilled in the art, the self-contained vacuum feature allows the apparatus of the present invention to be used in a wide variety of applications and/or situation. The use of conventional apparatus requiring connection to a vacuum source external to the apparatus is restricted to the proximity of the vacuum source. The apparatus of the present invention is transportable and is not dependant upon the availability of an external vacuum source.

Figure 1:
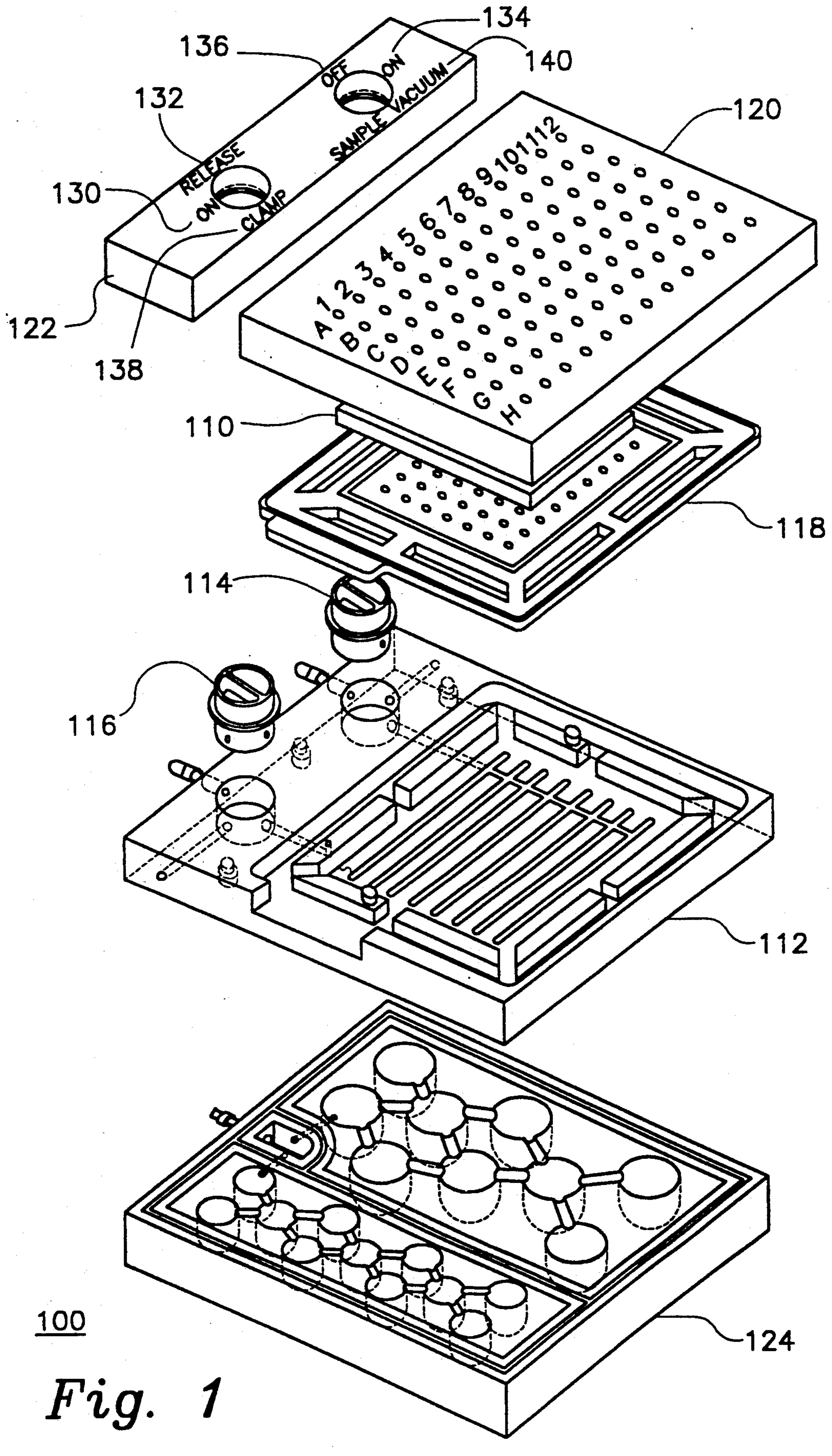
FIG. 1 is an exploded view of the present invention.

Referring first to FIG. 1, wherein an exploded view of the apparatus of the present invention is shown. The apparatus is identified by a reference numeral 100. The apparatus 100 generally comprises a filter membrane 110, a base plate 112, a first vacuum valve 114, a second vacuum valve 116, a gasket 118, a well plate 120, and a cover plate 122.

The filter membrane 110 is provided to receive and capture sample media. The filter membrane 110 is well known in the art. In the preferred embodiment, filter membrane 110 is made of either nylon or nitrocellulose. However, any type of filter membrane could potentially be used with the present invention. Such alternative filter membranes include, but are not limited to, cellulose acetate membranes, and modified nylon membranes.

The base plate 112 is generally configured to provide the two independent vacuum features. The first vacuum feature operates to bring the sample media contained in contact with the filter membrane 110. The second vacuum feature operates to clamp the filter membrane 110, base plate 112, gasket 118, and well plate 120 assembly together. The second vacuum feature replaces the screw clamps found in conventional apparatus.

The first vacuum valve 114 is generally provided to regulate the first vacuum feature. As shown herein, the first vacuum valve 114 is configured to allow the user to control the rate at which the media samples are drawn into contact with the filter membrane 110. As shown by cover plate 122, the first vacuum valve 114 is rotatable to a first position where the vacuum valve 114 is in an "on" position 134 and a second position where the first vacuum valve 114 is in an "off" position 136. When the first vacuum valve is in the "on" position 134, a vacuum is generated in the base plate 112 causing the sample media in the well plate 120 to be drawn in contact with the filter membrane 110.

The second vacuum valve 116 is generally provided to regulate the second vacuum feature. As will be more fully described herein, the second vacuum valve 116, allows the user to control the clamp force that holds the filter membrane 110, base plate 112, gasket 118, and well plate 120 assembly together. Application of the clamp force allows the apparatus 100 to be quickly assembled. Removal of the clamp force allows the apparatus 100 to be quickly disassembled. As also shown by the cover plate 122, the second vacuum valve 116 is rotatable to a first position where the second vacuum valve 116 is in an "on" position 130 and a second position where the second vacuum valve 116 is in a "release" position 132. When the second vacuum valve 116 is in the "on" position 130, a vacuum is generated in the base plate 112 causing the base plate 112/gasket 118/filter membrane 110/well plate 120 assembly to be securely held together.

The gasket 118 is generally provided to seal the apparatus 100 such that the first vacuum feature and the second vacuum feature can operate at optimum performance levels. As will be shown more fully herein, gasket 118 ensures that the necessary clamping force is maintained such that no leakage of vacuum occurs during operation of the first vacuum feature. Prevention of vacuum leakage during operation of the first vacuum feature is essential to ensuring that the sample media is properly disposed on the filter membrane 110. Failure to prevent vacuum leakage may result in migration of sample media across the filter membrane 110.

The well plate 120 is generally provided to hold the sample media to be tested by the apparatus 100. As will be described more fully herein, well plate 120 may be configured in a conventional 96 well microtiter configuration thereby allowing multiple sample media to be tested.

Vacuum base plate 124 is generally provided to function as an internal source of two independent internal vacuums. One vacuum is dedicated to the vacuum clamping feature while the second vacuum source is dedicated to the vacuum sampling feature. As will be shown herein, the base plate 112 is secured to the top of the vacuum base plate 124 by virtue of only the vacuums contained in the vacuum base plate 124.

Figure 2A:
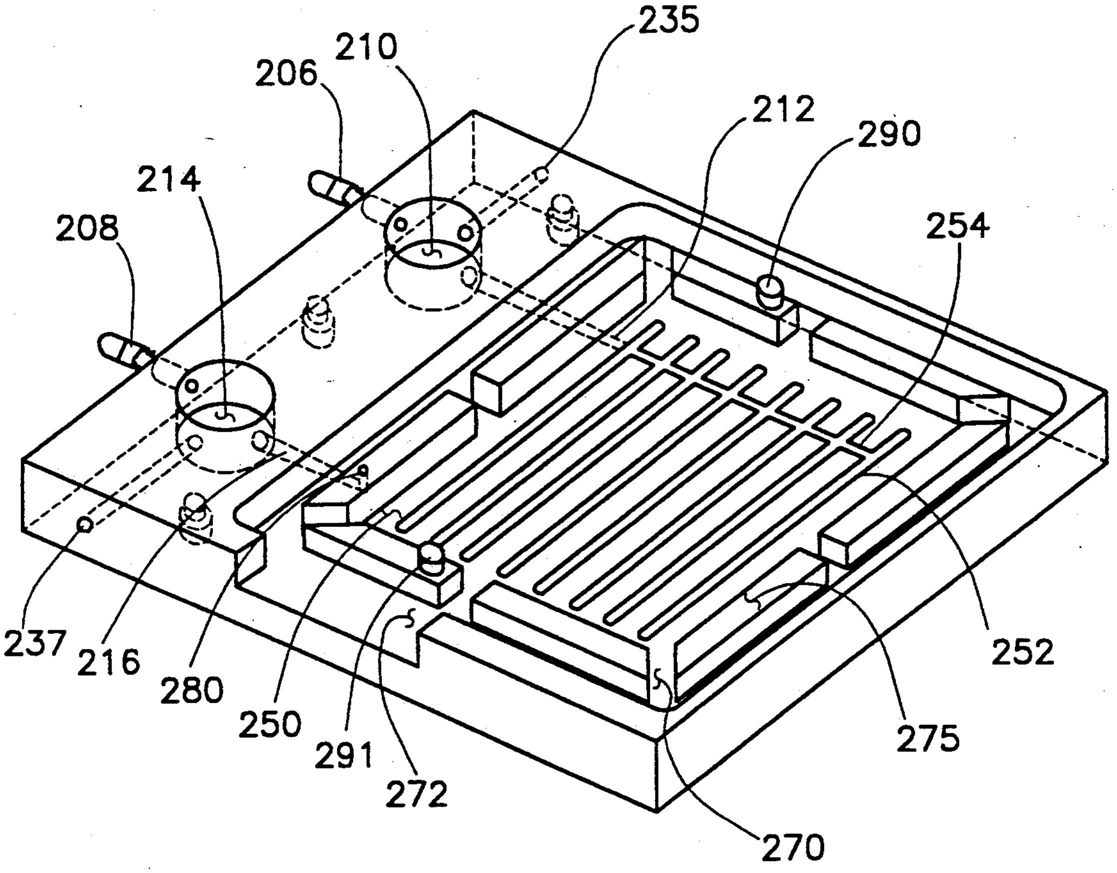
FIG. 2A is a perspective view of the base plate.
Figure 2B:
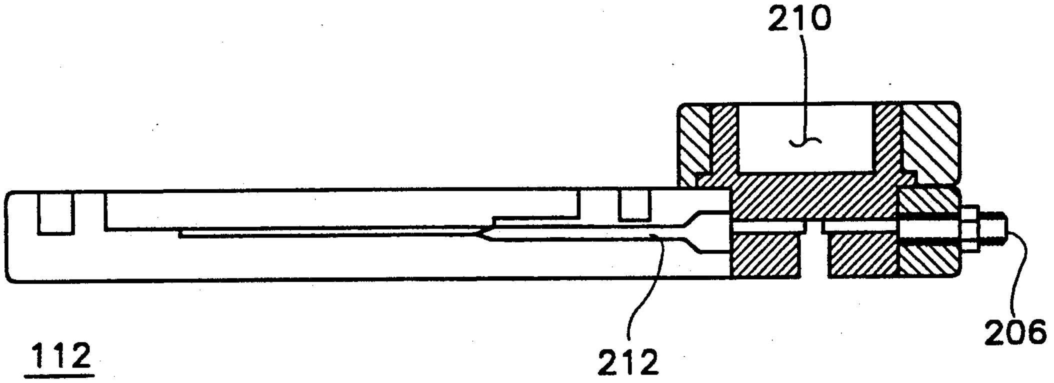
FIG. 2B is a section view of the base plate.

Referring now to FIGS. 2A and 2B, wherein a the base plate 112 is shown in more detail. Base plate 112 comprises a first opening 210 and a first channel 212. First opening 210 provides communication between the vacuum base plate 124 and the first channel 212. First opening 210 is configured to accept the first vacuum valve 114. As will be shown more fully herein, rotation of the first vacuum valve 114 causes the vacuum base plate 124 to be in and/or out of communication with the first channel 212. As will also be shown more fully herein, the first channel 212 extends into a reservoir area 250 (to be described).

Base plate 110 further comprises a second opening 214 and second channel 216. Second opening 214 is also in communication with the vacuum base plate 124 and the second channel 216. Second opening 214 is configured to accept the second vacuum valve 116. As will be shown more fully herein, rotation of the second vacuum valve 116 causes the vacuum base plate 124 to be in and/or out of communication with the second channel 216. As will be shown more fully herein, the second channel 216 extends into a vacuum clamping area 255 (shown in FIG. 4A and to be described in conjunction therewith).

The vacuum reservoir area 250 is a recessed region within the base plate 112. The vacuum reservoir area 250 acts as a receptacle wherein a vacuum is generated to to draw the sample media from the well plate 120 in contact with the filter membrane 110. The reservoir area 250 is sized such as to provide a proper vacuum area and to drain the sample media which passes through the filter membrane 110. The vacuum reservoir area 250, however, may take a variety of configurations.

The vacuum reservoir area 250 has formed therein a plurality of channels 252 equidistantly arranged. A single channel 254 connects the plurality of channels 252 to each other. Single channel 254 is provided so as to connect the channels 252 together. As will be shown more fully herein, the plurality of channels 252 that are formed in the reservoir area 250 are in registration with the openings (to be described) in the gasket 118 and the wells (to be described) of the well plate 120.

The base plate 110 has further formed therein a plurality of islands 275. As will be discussed below, the islands 275 in combination with the gasket 114 form the vacuum clamping area 255. The vacuum clamping area 255 is hereby defined as the area where the vacuum clamping means operates on the well plate 120.

The islands 275 are sized to closely receive the gasket 118. A gasket recess 270 is formed within the base plate 112, such that the top portion of gasket 118 (to be described) is at substantially the same height with the islands 275 of the base plate 112.

The base plate 112 further comprises an opening 280 positioned at the top of one island 275. Opening 280 is in communication with the second channel 216. Opening 280 introduces the clamping vacuum to the top of the island 275. As will shown more fully herein, the well plate 120 has formed a vacuum transfer channel (to be described) which allows the vacuum present at the opening 280 to uniformly digress throughout the top of the remaining islands 275 and those portions of the gasket 116 that lie between the islands 275.

The base plate 112 may further comprises a pair of positioning pins 290,291. The positioning pins 290,291 enable the well plate 120 to be accurately placed on top of the base plate 112, and thus gasket 118 when the apparatus 100 is assembled.

Base plate 112 may further comprise a first vacuum inlet 206 and a second vacuum inlet 208. First vacuum inlet 206 and second vacuum inlet 208 enables an external vacuum source (not shown) to be connected to the apparatus 100, if desired, thereby providing an alternative source (external however) of vacuum to that supplied by the vacuum base plate 124 (internal vacuum source).

First vacuum inlet 206 corresponds to the vacuum sampling feature. Second vacuum inlet 208 corresponds to the vacuum clamping feature. First vacuum inlet 206 and second vacuum inlet 208 are mounted in a hole (not shown) in the base plate 112 by conventional mounting means.

The first vacuum inlet 206 and second vacuum inlet 208 are conventional quick disconnect hose barbs. The only important criteria is that it mates with the conventional tubing which is typically connected to the external vacuum source. A wide variety of vacuum sources may be used with the apparatus 100.

Figure 3:
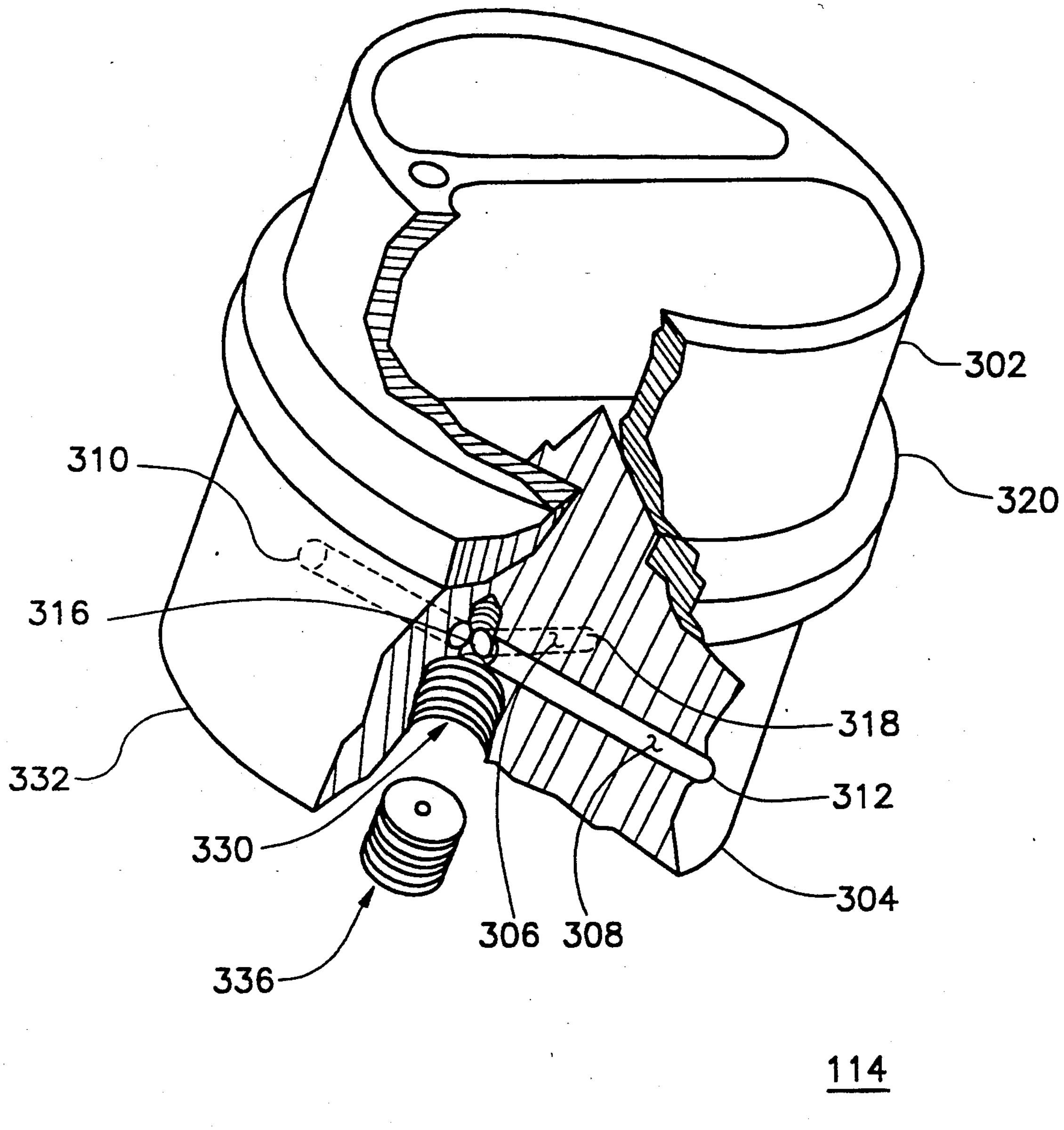
FIG. 3 is a cut-away view of the vacuum valve.

Referring now to FIG. 3, wherein the first vacuum valve 114 is shown in more detail. Generally, first vacuum valve 114 operates as a switch to turn on and off the sampling vacuum of the vacuum base plate 124. In particular, rotation of the first vacuum valve 114 to the "on" position 134 causes the vacuum base plate 124 to be in communication with the first channel 212 and therefore the vacuum reservoir area 250.

First vacuum valve 114 has an upper portion 302 and a lower portion 304. The lower portion 304 fits closely into the opening 210 of the base plate 112. A close fit is required to minimize leakage of vacuum. However, the lower portion 304 should be allowed to rotate within the opening 210.

Formed in the lower portion 304 is a first channel 306, a second channel 308, and a third channel 330. Channel 306 has on one end a first opening 318 and on the second end a second opening 316. Channel 308 extends completely through the center of the lower portion 304. Channel 308 has on one end a first opening 310 and on the second end a second opening 312. The second opening 316 of first channel 306 intersects with the second channel 308 thus allowing communication between the first channel 306 and the second channel 308.

The third channel 330 is centered on the bottom surface 332 of the lower portion 304 and extends up and intersects with, the first channel 306 and the second channel 308. The third channel 330 has a plug 336 that is removable from the third channel 330. For operation of apparatus 100 from an external source of vacuum, plug 336 may be positioned in third channel 330 to prevent loss of vacuum therethrough. For operation of apparatus 100 from vacuum base plate 124, plug 336 should be removed and first and second vacuum inlets 206 and 208 should be capped to prevent loss of vacuum therethrough.

Upon rotation of the first vacuum valve 114 to the "on" position 134 with plug 336 removed, the opening 310 is in registration with the channel 212, thereby allowing communication between the vacuum base plate 124 and the vacuum reservoir area 250.

The lower portion is further designed such that when the first vacuum valve 114 is rotated to the "off" position 136, the opening 310 is in registration with the third channel 235 of the base plate 112 and opening 318 is in registration with the channel 212, thus providing communication between the ambient atmosphere and the vacuum reservoir area 250. This communication allows the user to pressurize the vacuum reservoir area 250.

Alternatively or in addition, the lower portion may be further designed such that rotation of the first vacuum valve 114 to the "on" position 134 causes the openings 312 and 310 to be in registration with the first vacuum inlet 206 and first channel 212 of the base plate 112, respectively. As such, if desired, an external vacuum source (not shown) could be in communication with the vacuum reservoir area 250.

The first vacuum valve 114 further has formed ridge 320. Ridge 320 is formed is configured such that it will rest on the surface of the cover plate 122. Ridge 320 ensures that the openings 310 and 312 will register with the vacuum inlet 206 and channel 212 and that openings 310 and 318 will register with channel 235 and channel 212.

The second vacuum valve 116 is designed in a manner similar to that of first vacuum valve 114 describe above. The second vacuum valve 116 is designed such that rotation of the second vacuum valve 116 to the "on" position 130 results in communication between vacuum base plate 124 and channel 216 of base plate 112, thereby providing a vacuum to the vacuum clamping area 255. Rotation of the second vacuum valve 116 to the "release" position 132 results in communication between the channel 237 leading to the ambient environment and the channel 216 of the base plate 112, thus allowing for pressurization of the vacuum clamping area 255.

Figure 4A:
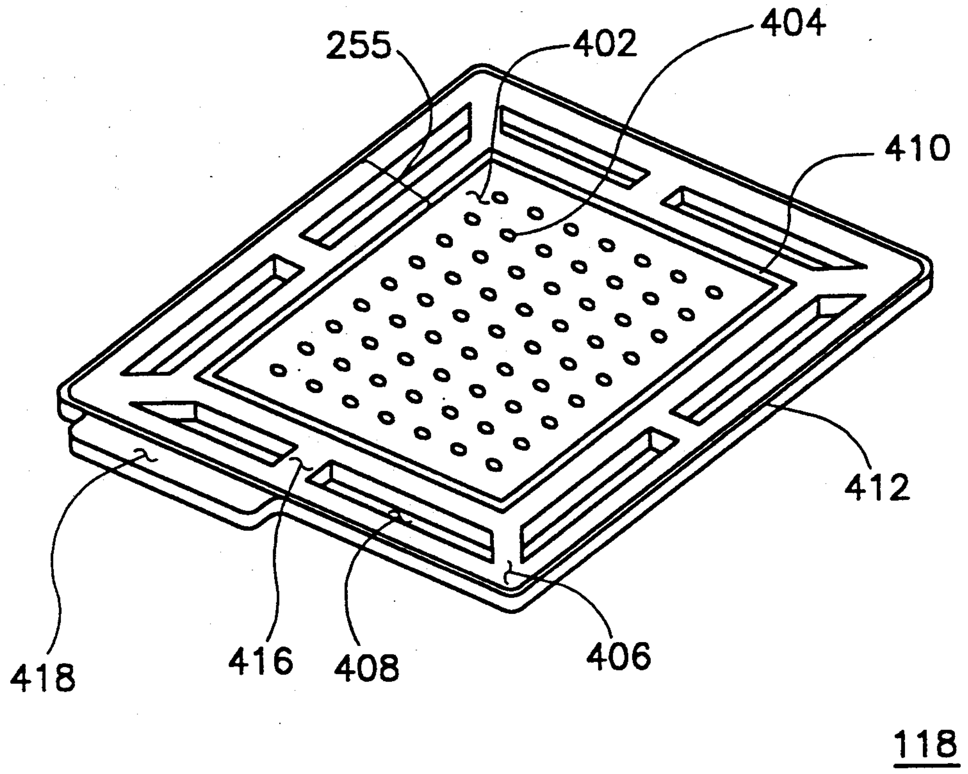
FIG. 4A is a perspective view of the gasket.
Figure 4B:
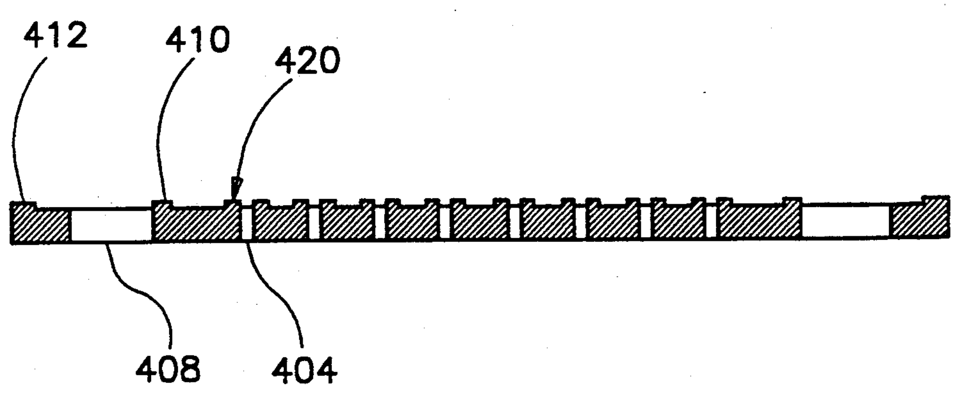
FIG. 4B is a section view of the gasket.

Referring now to FIGS. 4A and 4B, wherein the gasket 118 is shown in more detail. In the preferred embodiment, gasket 118 is made out of a flexible material, such as silicon or the like. However, gasket 118 can be made out of a variety of flexible and/or resilient materials.

The gasket 118 first comprises an inner section 402. Inner section 402 has formed therein a plurality of wells 404. In the embodiment shown by FIG. 4, a standard 96 microtiter well configuration is depicted. However, the claimed invention anticipates the use of any number of wells.

The gasket 118 further comprises a circular ridge 420 surrounding each well 404. The circular ridge rises approximately 0.020 inches above the surface of each well 404. The circular ridge ensures upon assembly, an airtight seal is made with the corresponding wells (to be described) of the well plate 120.

The gasket 118 further comprises a webbed section 406. Webbed section 406 comprises a plurality of webs 408 and bridges 416. The webs 408 and bridges 416 are configured to mate with the islands 275 formed in the base plate 112 to thereby firmly secure the gasket 118 therein.

The gasket 118 further comprises a first border ridge 410 and a second border ridge 412. First border ridge 410 surrounds the perimeter of the inner area 402. Second border ridge 412 surrounds the perimeter of the webbed section 406. The first and second border ridges 410 and 412 are about 0.020 inch in height and upon assembly, function to define a closed vacuum clamping area 255 that will not leak vacuum.

The gasket 118 further comprises a tab portion 418. Tab portion 418 is provided to allow easy removal of the gasket 118 from the base plate 112. Tab portion 418 is configured to mate with recess 272 of the base plate 112.

Figure 5A:
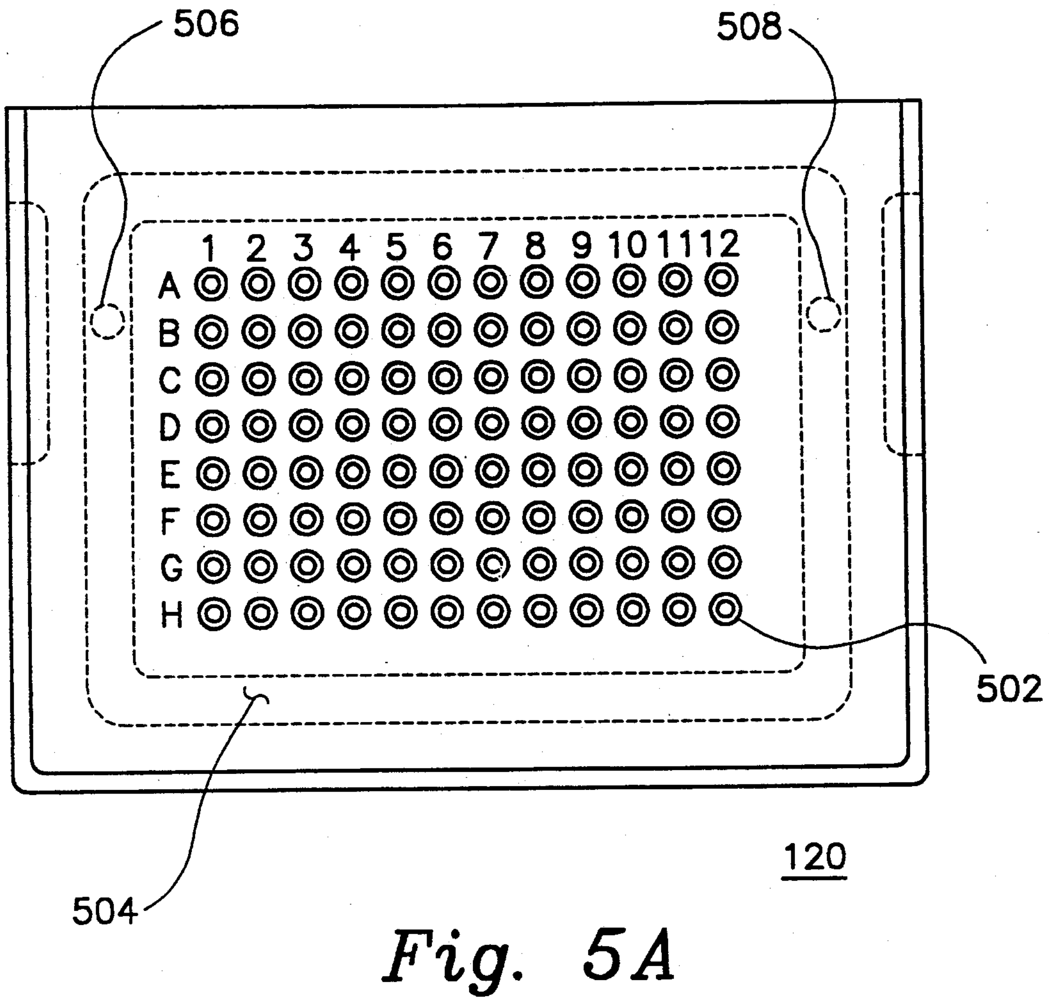
FIG. 5A is a plan view of the well plate.
Figure 5B:
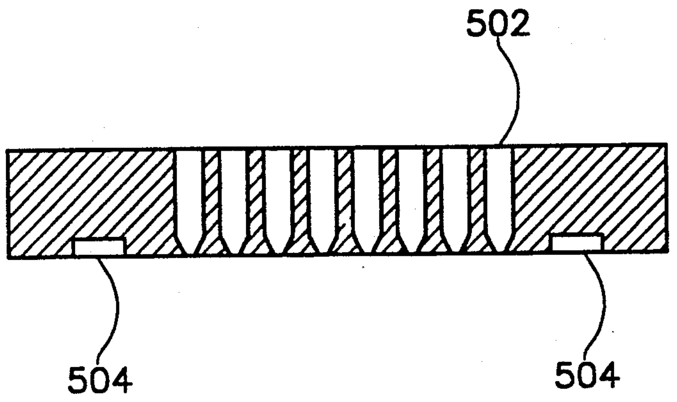
FIG. 5B is a section view of the well plate.

Referring now to FIGS. 5A and 5B, wherein the well plate 120 is shown in more detail. Well plate 120 first comprises a plurality of wells 502. In the embodiment shown in FIG. 5A, the wells 502 are configured in a standard 96 well microtiter configuration. However, well plate 120 could have wells of a variety of configuration depending on the type of test to be run in the apparatus 100.

The well plate 120 further comprises a recessed vacuum channel 504 having extending around the perimeter of the well 502 pattern. Upon assembly, the area at the periphery of the vacuum channel 504 would be in sealable contact with the ridges 410 and 412 of the gasket 118. As such, the vacuum channel 504 becomes the ceiling for the vacuum clamping area 255 and closes it.

The well plate 118 further comprises a pair of pin insets 506, 508 to facilitate the placement of the well plate 118 with the base plate 112. Upon assembly, the positioning pins 290,291 of the base plate 112 mate with the pin insets 506 and 508, respectively.

Figure 6A:
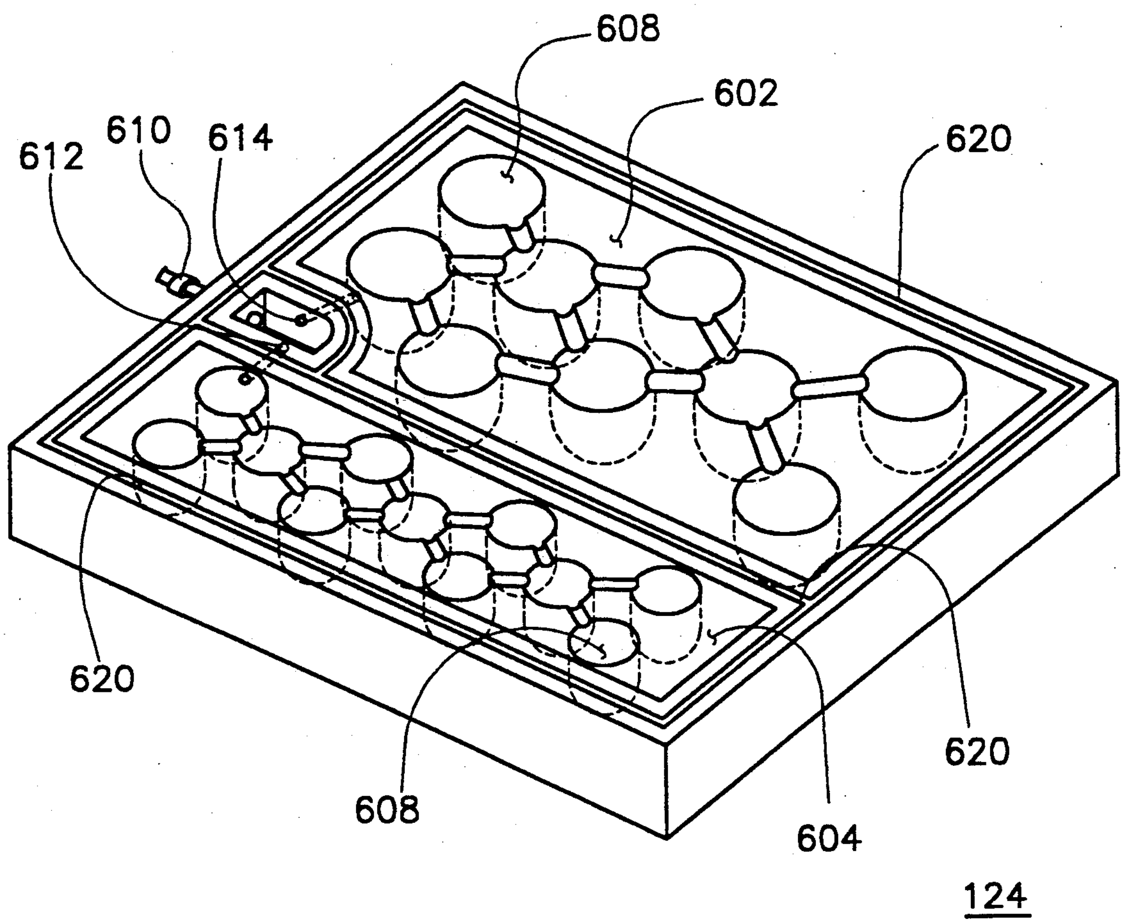
FIG. 6A is a perspective view of the vacuum base plate.
Figure 6B:
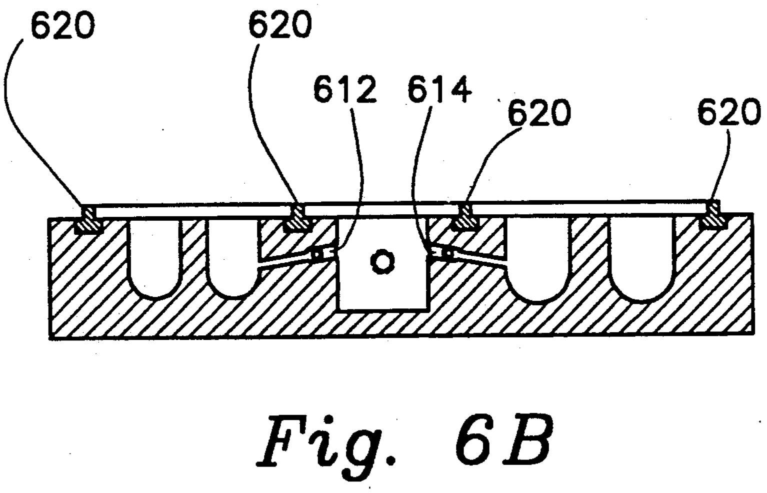
FIG. 6B is a section view of the vacuum base plate.

Referring now to FIGS. 6A and 6B, wherein the vacuum base plate 124 is shown in more detail. The vacuum base plate 124 comprises a first vacuum chamber 602 and a second vacuum chamber 604.

First vacuum chamber 602 is dedicated to proving a vacuum source to the sampling vacuum. Second vacuum chamber 604 is dedicated to providing a vacuum source for the clamping vacuum. First vacuum chamber 602 and second vacuum chamber 604 are each independently formed of a plurality of egg shaped cavities 608 each connected together. The egg shaped cavities 608 give strength to each vacuum chamber.

The vacuum base plate 124 further comprises a flexible material 620 surrounding the perimeter of the first and second vacuum chambers. Compression of the base plate 122 with the flexible material 620 creates an airtight seal between the first vacuum chamber 602 from the second vacuum chamber 604.

The vacuum base plate 124 further comprises a vacuum inlet 610. Vacuum inlet is adapted to connect to an external vacuum source when the either the first vacuum chamber 602 or the second vacuum chamber 604 needs recharging. A first ball valve 614 and a second ball valve 612 provided one-way communication from the valve inlet 610 to the first vacuum chamber 602 and the second vacuum chamber 604, respectively.

The operation of the present invention will now be described.

Initially, the base plate 112 is placed on top of the vacuum base plate 124 and the vacuum inlet 610 is connected to an external vacuum source. Additionally, the first vacuum valve 114 is set to the "release" position 132 and the second vacuum valve 116 is set to the "off" position 136. As such, operation of the apparatus 100 can now begin.

Application of the external vacuum source causes the first vacuum chamber 602 and the second vacuum chamber 604 to become de-pressurized. This in turn causes the base plate 112 to come into sealable contact with vacuum base plate 124. At this point, the first and second vacuum chambers 602 and 604 are sealed from each other. Thereafter, the apparatus 100 can be disengaged from the external vacuum source and is ready for testing of sample media.

The gasket 118 is first placed onto the base plate 112. The webbed sections 408 and the bridge sections 416 mate with the corresponding islands 275 on the base plate.

Thereafter, the filter membrane 110 is placed on the inner section 402 of the gasket 118.

Thereafter, the well plate 120 is placed on the base plate 112 via mating pins 291,290 and insets 506 and 508. Upon placement of the well plate 120 on the base plate 112, the wells 502 of the well plate 120 are in substantial registration with the wells 404 of the gasket 118. Furthermore, the channels 252 are positioned directly under the wells 404 of the gasket 110.

At this point, the apparatus 100 is ready to be clamped into position. The second vacuum valve 116 is rotated to the "on" position 130. As a result, under vacuum supplied by the second vacuum chamber 604, the well plate 120 is forced into contact with the upper surface of the island 275 and the ridges 410 and 412 of the gasket 118. The gasket 118 conforms with any irregularities found on the surface of well plate 120. The circular ridges surrounding the wells 502 of the gasket 118 are also compressed, thereby providing complete separation between the individual wells 502 of the well plate 112 on the filter membrane 110. Complete isolation of the wells 502 on the membrane 110 eliminates bleeding or migration of sample media across the filter membrane 110.

After a short period of time, the vacuum clamping force reaches maximum and the apparatus 100 is fully clamped. In this position, the ridges 410 and 412 of the gasket 118 are in sealable contact with the well plate 120 and the vacuum clamping area 255 is fully enclosed by the islands 275, the ridges 410 and 412, and the vacuum channel 504 of the well plate 120.

Thereafter, the filtration process can begin. Sample media may be loaded into the wells 502 of the well plate 120. Thereafter, the filtration process is initiated by rotating the first vacuum valve 114 to the "on" position 134. Rotation of the first vacuum valve 114 to the "on" position 134 causes a vacuum provided by the first vacuum chamber 602 to come about in the vacuum reservoir area 250. As such, the sample media contained in the wells 502 of the well plate 120 are brought into contact with the filter membrane 110. Sample media that passes through the filter membrane 110 are discharged through the vacuum reservoir area 250, out the channel 212 and, in the case of an external vacuum source, out through first vacuum inlet 206.

Upon completion of the filtration process, the user rotates the first vacuum valve 114 to the "off" position 136. In the "off" position, external vacuum source is disengaged from the vacuum reservoir area 250 and moreover, the vacuum reservoir area 250 is in communication with the surrounding ambient environment. This pressurizes the vacuum reservoir area 250 thereby stopping the drainage of sample media from the wells 502 of the well plate 120.

Thereafter, the user has two options. First, the user can re-load the well plate 120 with additional and/or different sample media. Because the second vacuum valve 116 is still in the "on" position 130, the user can not remove the well plate 120 and as such any re-loading of sample media would have to be done with the well plate 120 still in place.

Alternatively, and possibly more likely, the user may want to remove the filter membrane 110 for further testing or the user may want to remove only the well plate 120 so that an additional well plate 120 having additional and/or a different sample media to be tested with the existing sample media on the filter membrane 110. In either case, the user has to rotate the second vacuum valve 116 to the "release" position 132. Rotation of the second vacuum valve 116 to the "release" position 132 causes the second vacuum chamber 604 to be disengaged from the vacuum clamping area 255 and moreover, the vacuum clamping area 255 is in communication with the surrounding ambient environment. As such, this pressurizes the vacuum clamping area 250 thereby releasing the clamping force holding the apparatus 100 together.

At this point, the well plate 120 can be removed and replaced with another well plate 120 without removing the filter membrane 110. Alternatively, the user can remove the well plate 120 and the filter membrane 120. The filter membrane 110 can than be further tested as desired. Additionally, the gasket 118 can be removed by lifting up the tab 418 on gasket 118. The gasket 118 can then be cleaned and replaced on the base plate 112 for use in the next test. Alternatively, a different gasket 118 can be placed thereon.

In contrast to conventional devices, the present invention can draw the sample media into contact with the filter membrane in an uncontaminated manner. The vacuum clamping feature of the present invention creates isolated well patterns on the filter membrane thereby eliminating sample media migration or so called bleeding that occurs in conventional apparatus. Furthermore, the apparatus of the present invention can be quickly assembled and disassembled thus increasing test production output and efficiency.

Furthermore, the first vacuum chamber 602 and the second vacuum chamber 604 of the vacuum base plate 124 provide two self-contained vacuum sources for clamping the apparatus and drawing the sample media in contact with the filter membrane. The self contained vacuum sources allow the use of the apparatus of the present invention independent of external vacuum source availability.

It will be obvious to one of ordinary skill in that art, that numerous modifications and/or alternative embodiments of the present invention heretofore described are possible. Such modifications and/or alternative embodiment may include, but are not limited to, providing only one vacuum chamber as source of vacuum for either the clamping and/or sampling feature.

The foregoing description is intended primary for purposes of illustration. The present invention may be embodied in other forms or carried out in other ways without departing from the spirit or scope of the invention. Modifications and variations still falling within the spirit or the scope of the invention will be readily apparent to those of ordinary skill in the art.

What is claimed is:

1. An apparatus for testing sample media using a filter membrane, the apparatus comprising:

(a) a well plate having at least one well adapted to contain the sample media;

(b) first vacuum means for vacuum-clamping the filter membrane in sealable contact with said at least one well of said well plate to substantially preclude migration of the sample media across the filter membrane and for providing an alternative to sealing by mechanical clamping;

(c) second vacuum means for drawing the sample media contained in said at least one well into contact with the filter membrane; and (d) vacuum chamber means integral to the apparatus for providing a vacuum sufficient for enabling operation of said first vacuum means independent of an external vacuum source.

2. The apparatus of claim 1, wherein said first vacuum means and said second vacuum means include a base plate, said base plate comprising a vacuum reservoir area and a vacuum clamping area.

3. The apparatus of claim 2, wherein said first vacuum means includes a vacuum clamping valve disposed on said base plate, said vacuum clamping valve being adapted to selectively connect said vacuum chamber means to said vacuum clamping area.

4. The apparatus of claim 3, wherein said vacuum chamber means is connected to a vacuum inlet adapted for connection to an external vacuum source.

5. An apparatus for testing sample media using a filter membrane, the apparatus comprising:

(a) a well plate having at least one well adapted to contain the sample media;

(b) first vacuum means for vacuum-clamping the filter membrane in sealable contact with said at least one well of said well plate to substantially preclude migration of the sample media across the filter membrane and for providing an alternative to sealing by mechanical clamping;

(c) second vacuum means for drawing the sample media contained in said at least one well into contact with the filter membrane; and (d) vacuum chamber means integral to the apparatus for providing a vacuum sufficient for enabling operation of said second vacuum means independent of an external vacuum source.

6. The apparatus of claim 5, wherein said first vacuum means and said second vacuum means include a base plate, said base plate comprising a vacuum reservoir area and a vacuum clamping area.

7. The apparatus of claim 6, wherein said second vacuum means includes a vacuum sampling valve disposed on said base plate, said vacuum sampling valve being adapted to selectively connect said vacuum chamber means to said vacuum reservoir area.

8. The apparatus of claim 7, wherein said vacuum chamber means is connected to a vacuum inlet adapted for connection to an external vacuum source.

9. An apparatus for testing sample media using a filter membrane, the apparatus comprising:

(a) a well plate having at least one well adapted to contain the sample media;

(b) first vacuum means for vacuum-clamping the filter membrane in sealable contact with said at least one well of said well plate to substantially preclude migration of the sample media across the filter membrane and for providing an alternative to sealing by mechanical clamping;

(c) second vacuum means for drawing the sample media contained in said at least one well into contact with the filter membrane;

(d) first vacuum chamber means integral to the apparatus for providing a vacuum sufficient for enabling operation of said first vacuum means independent of an external vacuum source; and (e) second vacuum chamber means integral to the apparatus for providing a vacuum sufficient for enabling operation of said second vacuum means independent of an external vacuum source.

10. The apparatus of claim 9, wherein said first vacuum means and said second vacuum means include a base plate, said base plate comprising a vacuum reservoir area and a vacuum clamping area.

11. The apparatus of claim 10, wherein said first vacuum means includes a vacuum clamping valve disposed on said base plate, said vacuum clamping valve being adapted to selectively connect said first vacuum chamber means to said vacuum clamping area.

12. The apparatus of claim 11, wherein said second vacuum means includes a vacuum sampling valve disposed on said base plate, said vacuum sampling valve being adapted to selectively connect said second vacuum chamber means to said vacuum reservoir area.

13. The apparatus of claim 12, wherein said first and second vacuum chamber means are connected to a vacuum inlet adapted for connection to an external vacuum source.

* * * * *